Figure 1:
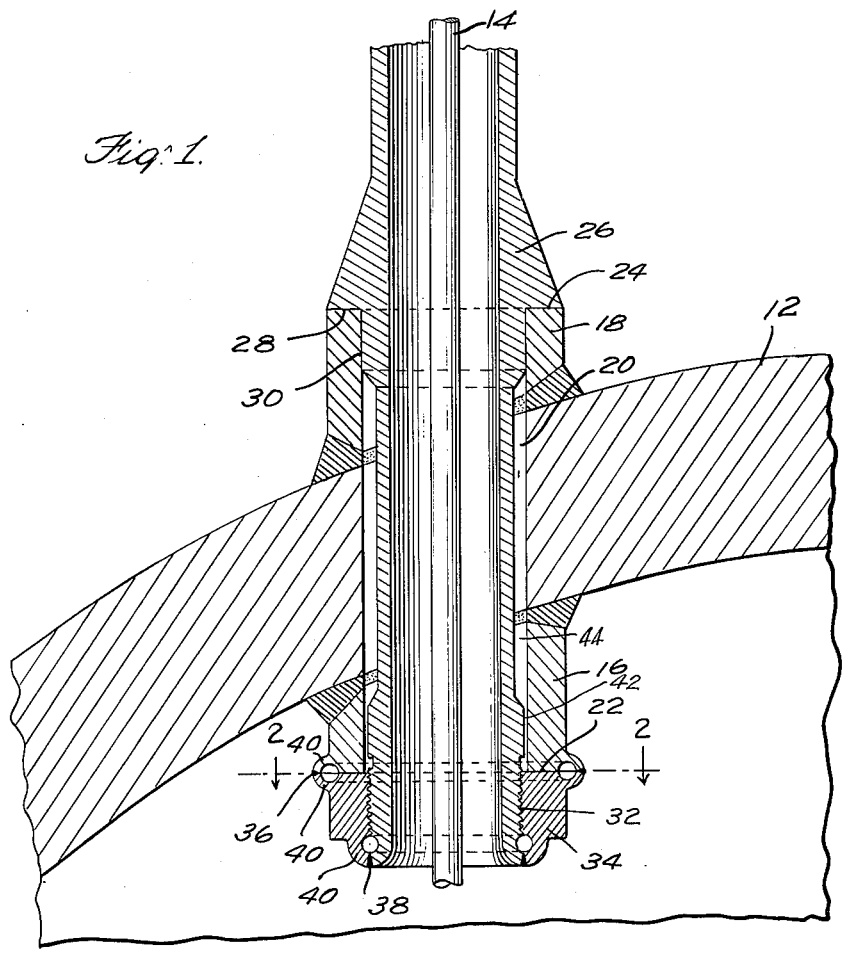

March 15, 1966  A. BELL  3,240,514

REACTOR ATTACHMENT

Filed Jan. 31, 1962

INVENTOR
ALAN BELL

BY Richard H. Thomas
ATTORNEY

United States Patent Office 3,240,514
Patented Mar. 15, 1966

3,240,514
REACTOR ATTACHMENT
Alan Bell, Cookham, Berks, England, assignor to Foster Wheeler Corporation, New York, N.Y., a corporation of New York
Filed Jan. 31, 1962, Ser. No. 170,016
1 Claim. (Cl. 285—158)

This invention relates to a mechanical joint by which a driving mechanism mounted on a pressure vessel wall may be connected by a shaft to means within the vessel. A principal use of the invention is in connection with nuclear reactor vessels wherein control rods for the vessel are driven by motors or gear drives supported by attachments to the vessel wall, the motors or drives being connected to the control rods directly with the rods extending through the vessel wall or being connected by means of drive shafts passing through the vessel wall.

Because the action of the control rods in a nuclear reactor is of the utmost importance, affecting not only the successful operation of the reactor but also its safety, very strict alignment of the rods or drive shafts is generally specified. This means that the attachment by which the drive motor is mounted on the vessel must be just as strictly aligned. Where the attachment is made by welding, it is quite possible that the resulting distortion may exceed the permissible or specified limit.

The invention is concerned with the elimination of this risk by the use of a mechanical joint.

In a mechanical joint in accordance with the invention, the motor is supported on a tube and the drive shaft or control rod passes concentrically within the tube. The support tube extends through a hole in the reactor vessel. Outside the vessel, the tube has an annular enlargement which is machined to bear on an accurately machined facing on the outer surface of the vessel encompassing the hole through which the tube passes. The inner end of the tube is threaded to receive a nut which can be screwed onto it so as to engage an accurately machined facing on the inner surface of the vessel. The joint may be rendered leak-proof by seal welding between the nut and the inner machined face and between the nut and the tube.

The accuracy of alignment of a joint in accordance with the invention is dependent only on the accuracy with which the facings are machined on the inside and outside of the vessel wall. And the joint is not liable to the distortion which may result from welding.

As an embodiment of the invention, where the drive shaft or control rod is required to pass through the vessel at an oblique angle, it is convenient to weld stub tubes to the inner and outer sides of the vessel around the opening at the desired angle and to machine the ends of these stubs at right angles to the axis of the drive shaft or control rod.

Figure 2:
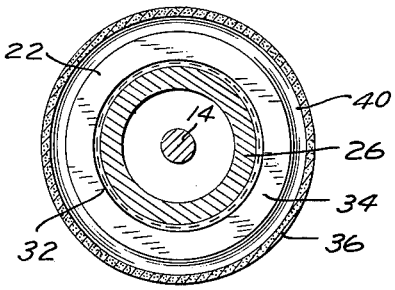

In order that the invention may be better understood, a mechanical joint for mounting a reactor control rod driving mechanism on a reactor vessel in accordance with the invention will be described by way of example and with reference to the accompanying drawing, in which:

FIGURE 1 is a partial sectional elevation view of a reactor embodying the concepts of the invention; and
FIGURE 2 is a section view taken along line 2—2 of FIG. 1.

In the example of the invention illustrated in FIGS. 1 and 2, a motor or drive mechanism (not shown) is required to be mounted on a vessel 12 at a point where a drive shaft 14, connected to a reactor control rod (not shown), must pass through the vessel. In this instance, the vessel wall is sloped at the point of mounting so that the drive shaft must pass through the vessel wall at an oblique angle.

To accomplish this, inner and outer stub tubes 16 and 18 are welded to the inner and outer surfaces of the vessel so as to encompass the opening 20 through which the drive shaft extends. The stub tubes are located to approximately parallel the required direction of the axis of the drive shaft, and the free ends 22 and 24 of the tubes are accurately machined to form facings normal to said axis. A support tube 26 is projected through the hole 20 and through the stub tubes, and is provided with an annular shoulder 28 accurately machined to seat on the machined free end 24 of the outer stub tube 18. The outer surface or portion 30 of the support tube adjacent and normal to the shoulder 28, is also accurately machined to provide a snug or close fit between the support tube and the inner surface of the stub tube 18. A motor or drive mechanism (not shown) may be suitably mounted on the support tube.

The inner end 32 of the support tube is threaded to receive a nut 34 having an accurately machined face which, when the nut is screwed on, engages and bears on the machined face 22 of the inner stub tube, an inner portion 42, adjacent the threaded end 32 within the inner stub tube 16, is designed to loosely fit. Between the outer portion 30 and the inner portion 40 is a central portion 44 which has a diameter substantially smaller than either the outer portion 30 or the inner portion 42 of the support tube 46. In this way, the support tube may be accurately aligned with the desired axis of the drive shaft 14.

Maximum leak-tightness is insured by making seal welds 36 and 38 between the nut and the inner stub and between the nut and the motor support tube respectively. This seal welding eliminates the need for gaskets at the joint faces.

To avoid misalignment of the support tube resulting from the seal welding, toroidal welds are used for the seal welding accomplished by cutting away opposed surfaces of the inner stub and nut and the support tube and nut, adjacent the area to be welded, to provide weakened areas such as designated by the numeral 40 capable of receiving the weld without transmitting the welding stresses to the respective elements involved.

For ease of alignment the motor support tube 26 has a reduced outside diameter where it passes through the vessel wall.

Although the invention has been described with respect to an arrangement wherein the drive shaft must pass through the vessel wall at an oblique angle, requiring the use of stub tubes, the drive shaft may pass at right angles through the vessel wherein the vessel itself is provided with opposed inner and outer machined surfaces against which the retaining nut and support tube may bear. Also the invention can be used where an accurate alignment of any shaft, for instance a reactor control rod or any other such means, is required.

Other arrangements will be apparent to those skilled in the art, and the invention is to be limited only as defined in the following claim:

What is claimed is:
A mechanical joint comprising:
 a vessel wall having a circular opening therethrough said circular opening having a longitudinal axis;
 opposed inner and outer stub tubes having a longitudinal axis approximately common with one another and with the longitudinal axis of the opening through the vessel wall, said opposed inner and outer stub tubes being welded to said vessel wall and having a common inside diameter approximately equal to the diameter of said circular opening in the vessel wall, said opposed inner and outer stub tubes further having free ends which are accurately machined to form facings normal to said common longitudinal axis;

a support tube extending through said opposed inner and outer stub tubes and vessel wall and having a machined shoulder portion complementary to the face of the outer stub tube seated on the machined facing of the outer stub tube and an outer portion adjacent said shoulder portion and within said outer stub tube which is closely fitted within said outer stub tube, said support tube further having a threaded end extending from the free end of the inner stub tube to beyond the inner stub tube and having an inner portion adjacent said threaded end within said inner stub tube which is loosely fitted within said inner stub tube, said support tube still further having a central portion between said outer portion and said inner portion which has a diameter substantially smaller than both said outer portion and inner portion;

a nut having a machined face complementary to the face of the inner stub tube adapted to bear on the machined facing of the inner stub tube, said nut being drawn against said inner machined facing by said threaded end; and annular toroidal seal welds between said nut and said threaded end of support tube and between said nut and said machined facing of said inner stub tube, the seal welded elements being provided with weakened areas separating the portions welded from the main parts of said elements to avoid distortion during welding.

References Cited by the Examiner

UNITED STATES PATENTS

| | | | |
|---|---|---|---|
| 1,400,541 | 12/1921 | Hansen | 285—158 X |
| 1,435,010 | 11/1922 | Lachman | 285—286 |
| 1,541,725 | 6/1925 | Martin | 285—328 |
| 1,577,591 | 3/1926 | Rieger | 29—481 |
| 1,651,016 | 11/1927 | Cotton | 285—286 |
| 1,875,404 | 9/1932 | Aiton | 285—286 |
| 1,886,427 | 11/1932 | Riccius | 285—138 |
| 1,936,420 | 11/1933 | Bailey | 285—158 X |
| 2,050,339 | 8/1936 | Kidd | 285—286 |
| 2,262,212 | 11/1941 | Stone | 29—481 |
| 2,788,994 | 4/1957 | Van de Wateren | 285—286 |
| 2,793,830 | 5/1957 | Nakaji et al. | 285—161 X |
| 3,003,601 | 10/1961 | Ott | 285—21 |

FOREIGN PATENTS 718,625  11/1954  Great Britain.

CARL W. TOMLIN, *Primary Examiner.*

D. W. AROLA, *Assistant Examiner.*